UNITED STATES PATENT OFFICE.

JAMES H. STEBBINS, JR., OF NEW YORK, N. Y.

IMPROVEMENT IN COLORS FROM DIAZO-BENZOLE NITRATE AND PYROGALLOL.

Specification forming part of Letters Patent No. 221,114, dated October 28, 1879; application filed April 23, 1879.

*To all whom it may concern:*

Be it known that I, JAMES H. STEBBINS, Jr., of the city, county, and State of New York, have invented a new and useful Improvement in Coloring-Matters, which improvement is fully set forth in the following specification.

This invention relates to a coloring-matter which is produced by the action of diazo-benzole nitrate on an alkaline solution of pyrogallol.

In carrying out my invention I take pyrogallol and dissolve it in water, to which is added a few drops of potash hydrate, so as to render the solution alkaline. To this solution is added an aqueous solution of diazo-benzole nitrate.

The proportion in which these ingredients are used is about as follows: Pyrogallol, ten ounces; water, one hundred ounces; diazo-benzole nitrate, one ounce; water, one hundred ounces. Immediately a brick-red precipitate is formed, the bulk of which increases on standing. This precipitate is collected on a filter and left to dry. It is then treated with glacial acetic acid, which dissolves the same readily. On standing for a while fine red-brown crystals are formed, which are purified by recrystallization.

These crystals compose my new coloring-matter, which I have termed "pyrogallidine."

This coloring-matter dyes silk a sort of yellow-brown color, and wool, with a tannic-acid mordant, a similar color. It dissolves in alcohol and nitro-benzole, and very readily in acetic acid. It is not soluble in water; but by converting it into a soda-salt or sulpho-salt it is rendered soluble in water.

What I claim as new, and desire to secure by Letters Patent, is—

As a new manufacture, the coloring-matter or dye-stuff obtained from the reaction of diazo-benzole nitrate on an alkaline solution of pyrogallol, substantially in the manner set forth, or by any other method which will produce a like result.

In testimony that I claim the foregoing I have hereunto set my hand and seal this 19th day of April, 1879.

JAMES H. STEBBINS, JR. [L. S.]

Witnesses:
W. HAUFF,
E. F. KASTENHUBER.